United States Patent [19]

Ohnishi et al.

[11] Patent Number: 5,555,334
[45] Date of Patent: Sep. 10, 1996

[54] OPTICAL TRANSMISSION AND RECEIVING MODULE AND OPTICAL COMMUNICATION SYSTEM USING THE SAME

[75] Inventors: Kunikazu Ohnishi, Yokosuka; Masayuki Inoue; Yoshio Suzuki, both of Yokohama; Yukio Fukui, Tokyo, all of Japan

[73] Assignee: Hitachi, Ltd., Tokyo, Japan

[21] Appl. No.: 319,940

[22] Filed: Oct. 7, 1994

[30] Foreign Application Priority Data

Oct. 7, 1993 [JP] Japan .................. 5-251700
Mar. 17, 1994 [JP] Japan .................. 6-046712

[51] Int. Cl.⁶ .................................. G02B 6/36
[52] U.S. Cl. .................. 385/93; 385/33; 385/37
[58] Field of Search ............................ 385/37, 33, 34, 385/35, 88, 89, 90, 91, 92, 93, 94

[56] References Cited

U.S. PATENT DOCUMENTS

| | | | |
|---|---|---|---|
| 4,834,485 | 5/1989 | Lee | 385/37 |
| 4,945,527 | 7/1990 | Sunagawa | 385/37 |
| 5,164,930 | 11/1992 | Sugiura | 385/37 |
| 5,181,265 | 1/1993 | Nishiwaki et al. | 385/93 |

FOREIGN PATENT DOCUMENTS

| | | | |
|---|---|---|---|
| 0205359 | 12/1986 | European Pat. Off. | 385/93 |
| 3231492A1 | 3/1984 | Germany . | |
| 3432743A1 | 3/1986 | Germany . | |
| 62-229206 | 10/1987 | Japan . | |

*Primary Examiner*—John Ngo
*Attorney, Agent, or Firm*—Antonelli, Terry, Stout & Kraus

[57] ABSTRACT

A bidirectional optical transmission and receiving module of a simplified structure and an optical communication system using the same. The optical transmission and receiving module includes a light emitting device and a light receiving device disposed with in a same package having an opening covered with a cover glass sheet, and a holographic diffraction grating provided on a top or lower surface of the glass sheet. In transmitting operation, a light beam emitted from the light emitting device passes through the diffraction grating to be concentrated onto an end face of an optical fiber by a lens. In receiving operation, a received light beam emanated from the end face of the optical fiber reaches the diffraction grating via the lens to be thereby diffracted. A plus-sign primary diffracted light beam resulting from the diffraction is concentrated onto a light detecting surface of the light receiving device. Signal as transmitted through the optical fiber in the form of signal light can thus be received.

22 Claims, 9 Drawing Sheets

F I G. 1
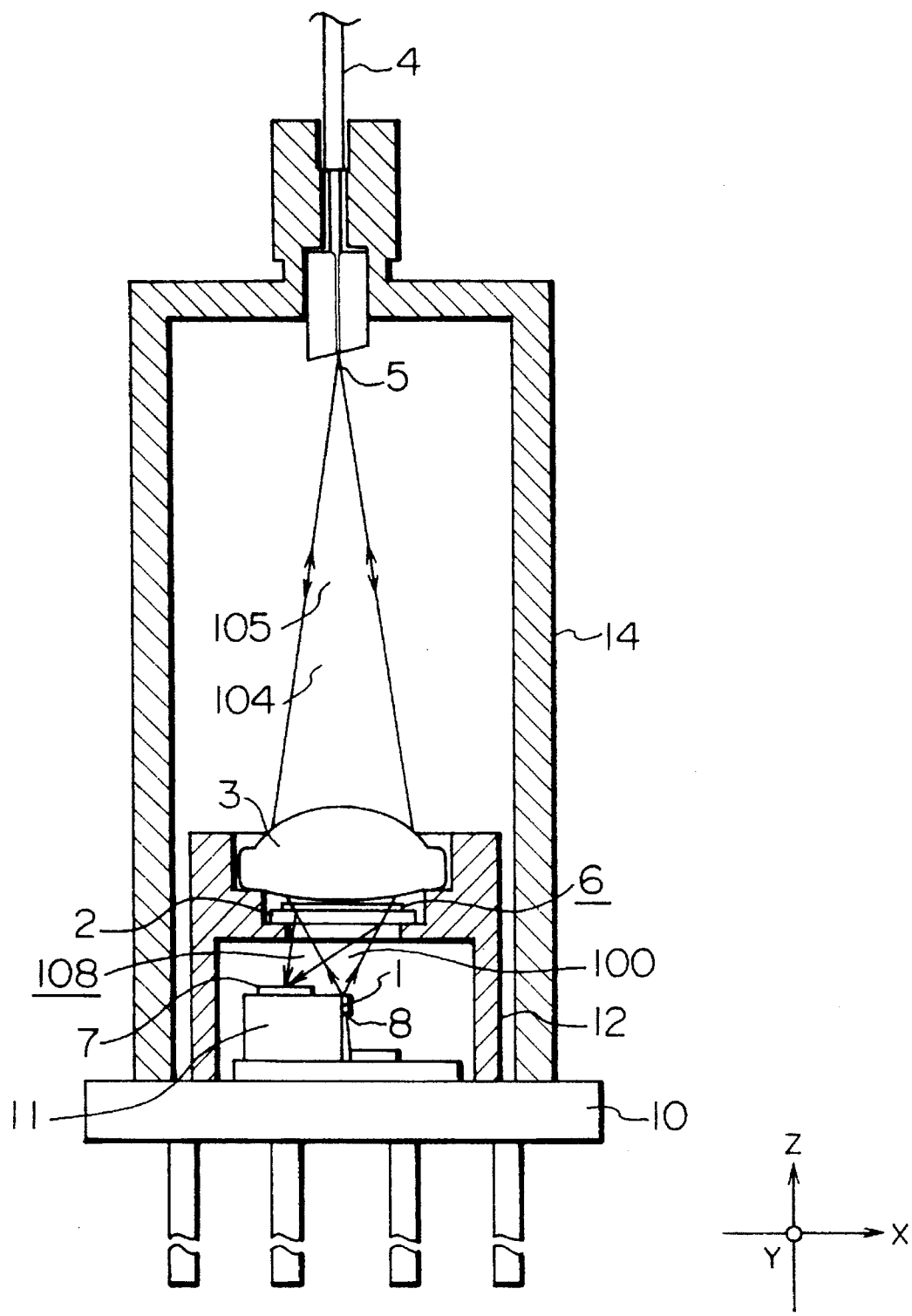

… (1)

OPTICAL TRANSMISSION AND RECEIVING MODULE AND OPTICAL COMMUNICATION SYSTEM USING THE SAME

BACKGROUND OF THE INVENTION

The present invention relates in general to an optical transmission and receiving module which is connected to an optical transmission path such as an optical fiber at an end thereof for transmitting (or sending) and receiving an information signal. More particularly, the invention is concerned with an optical transmission module which includes a light emitting device and a light receiving device (photodetector) disposed within a single package for performing a bidirectional transmission of information or data. Further, the invention is also concerned with an optical communication system in which the optical transmission and receiving modules mentioned above are employed.

In an optical transmission system such as typified by an optical communication system in which an optical transmission path constituted, for example, by an optical fiber cable (hereinafter, the optical transmission path will also be referred to as the optical fiber for convenience of description), there is employed a bidirectional optical transmission module (hereinafter referred to as the optical module for simplification of description) as a terminal for transmission and reception of information, a typical structure of which is disclosed in, for example, JP-A-62-229206. This prior art optical module is comprised of a light emitting device, a collimator lens for collimating light emitted from the light emitting device, a light receiving device (photodetector), a condenser lens for coupling a light beam to the light receiving device, a common-port lens for collimating a light beam emitted from an end face of an optical fiber, and a penta-prism block provided with a filter for branching or multiplexing with respect to wavelength of light, wherein the components mentioned above are accommodated within a single metal casing.

SUMMARY OF THE INVENTION

An object of the present invention is to provide an optical transmission module of a structure which is advantageously suited for implementation in a small size at a low cost and which can ensure great utility in practical applications.

Another object of the invention is to provide an optical communication system structured by using the optical transmission and receiving modules mentioned above.

In view of the above and other objects which will become apparent as description proceeds, there is provided according to an aspect of the present invention an optical transmission module, which includes a light emitting device, a light receiving device (photodetector), an optical element (e.g. lens or the like) for introducing a light beam emitted from the light emitting device to a predetermined optical fiber, a housing for accommodating at least the light emitting device and the light receiving device (photodiode), a window formed in the housing and provided with a transparent material (hereinafter also referred to as cover glass for convenience of description), and a diffraction grating having grooves of rectilinear or curvilinear traces and provided on an upper surface or a lower surface of the cover glass.

In a preferred mode for carrying out the invention, the diffraction grating may be so mounted as to be rotatable together with the cover glass around an axis which extends substantially in parallel with an optical axis of the light beam passed through the cover glass.

As the light receiving device, there may preferably be employed a light emitting device which has a light receiving surface of a rectangular form or a trapezoidal form or an elliptic form of which a longitudinal axis (major axis) extends substantially in parallel with a straight line interconnecting the light receiving element and the light receiving device.

Further, a band pass optical filter (wavelength-selective filter) may be disposed on an optical path extending from the end face of the optical fiber to the light receiving device for the purpose of allowing a light beam of a predetermined wavelength to pass therethrough selectively.

Furthermore, a diffraction efficiency of the diffraction grating for a first light beam emanated from the end face of the optical fiber and reaching the light receiving device after diffraction by the grating should preferably be made to be equal to or higher than the diffraction efficiency of the same diffraction grating for a second light beam which is emitted from the light emitting device and incident on the end face of the optical fiber via the diffraction grating.

For realizing the conditions mentioned above, the groove depth of the diffraction grating should preferably be selected such that the relation given by the following expression (1) can be satisfied. Namely, $$d \approx m \cdot \lambda_2 / (n_0 - n_1) \qquad \ldots (1)$$

where $d$ represents the groove depth of the diffraction grating, $n_0$ represents a refractive index of a substrate material constituting the diffraction grating, $n_1$ represents a refractive index of an ambient medium contacting the diffraction grating, $\lambda_2$ represents wavelength of the aforementioned second light beam, and $m$ represents an integer.

In another mode for carrying out the invention, the grooves of the diffraction grating may be formed each in a saw-tooth like shape as viewed in cross section. In that case, the groove depth of the diffraction grating should preferably satisfy the relation given by $$d \geq 0.3 \lambda_1 / (n_0 - n_1) \qquad \ldots (2)$$

where $d$ represents the groove depth of the diffraction grating, $n_0$ represents a refractive index of a substrate material constituting the diffraction grating, $n_1$ represents a refractive index of an ambient medium contacting the diffraction grating, and $\lambda_1$ represents wavelength of the first light beam mentioned previously.

Additionally, in the optical module according to the invention, such geometrical conditions should preferably be satisfied that a normal to the plane of the end face of the optical fiber onto which the second light beam impinges as well as normals to the planes of inner surface portions of the housing onto which the first or second light beam or diffracted light beams generated separately from the first and second light beams by the diffraction grating are incident do not extend in parallel with the optical axes of the diffracted light beams.

In a further preferred mode for carrying out the invention, there may be employed as the light emitting device such a device which has both a function for emitting a light beam in accordance with a predetermined electric signal and a photodetecting function for outputting a predetermined electric signal in accordance with a quantity of light of the incident light beam.

Additionally, according to yet another aspect of the invention, there is provided in view of the object mentioned previously an optical communication system in which the optical transmission modules described above are employed for transmission and reception of the information via the optical fiber.

By virtue of the structures of the optical modulator according to the invention described above, the received light beam introduced to the optical module by way of the optical fiber is diffracted by the diffraction grating provided on the top or bottom surface of the cover glass so that the diffracted light beam can impinge onto the light receiving element (photodetector) disposed in the close vicinity of the light emitting device. In other words, in the optical module according to the invention, the light emitting device and the light receiving device (photodetector) can be disposed remarkably closer to each other when compared with the prior art optical module. Besides, the optical parts accommodated within the housing can be disposed in a rectilinear array. These features are extremely advantageous in implementing the optical module in a miniaturized and simplified structure.

Further, because the diffraction grating can angularly be displaced around the optical axis, it is possible to adjust easily the position at which the light beam resulting from the diffraction by the diffraction grating and incident on the light receiving element is concentrated.

Besides, owing to the rectangular or trapezoidal or elliptical shape of the light receiving surface of the light receiving element, there can constantly be ensured the satisfactory and improved reception performance of the optical module, even when the position at which the light beam impinges on the light receiving surface should changes in accompanying possible changes in the wavelength of the received light beam.

Additionally, by providing on the optical path extending from the end face of the optical fiber to the light receiving device the band pass optical filter which allows the light beam of a predetermined wavelength to pass therethrough and/or by making the diffraction efficiency substantially equal to zero for the light beam having a particular wavelength by designing the groove depth $\underline{d}$ of the diffraction grating so that the relation given by the aforementioned expression (1) can be satisfied, desirable optical crosstalk characteristics can be realized for the transmitted light beam and the received light beam.

Furthermore, with the saw-tooth like configuration of the grating grooves in the cross section, the diffraction efficiency for the light beam of a predetermined wavelength can be enhanced, whereby the light utilization efficiency in the information transmitting/receiving operation can ultimately be increased while ensuring the desirable optical crosstalk characteristics between the transmitted light beam and the received light beam.

Furthermore, by using a device having both the light emitting function and the photodetecting function as the optical module, a first light beam to be received by this optical module and a second light beam to be sent out therefrom can simultaneously transmitted through the optical fiber in multiplex.

As will be appreciated from the above description, there is provided according to the invention a bidirectional optical module implemented in a small and simple structure and enjoying numerous advantages from the view point of practical utility. Thus, the present invention contributes to miniaturization and inexpensive implementation of the bidirectional optical transmission and receiving modules and hence the optical communication system in which the same are employed.

The invention will become more readily apparent from the following description of preferred embodiments thereof shown, by way of example only, in the drawings.

BRIEF DESCRIPTION OF THE DRAWINGS

FIG. 1 is a sectional view showing schematically a major portion of an optical module according to a first embodiment of the invention;

DESCRIPTION OF THE PREFERRED EMBODIMENTS

Figure 2:
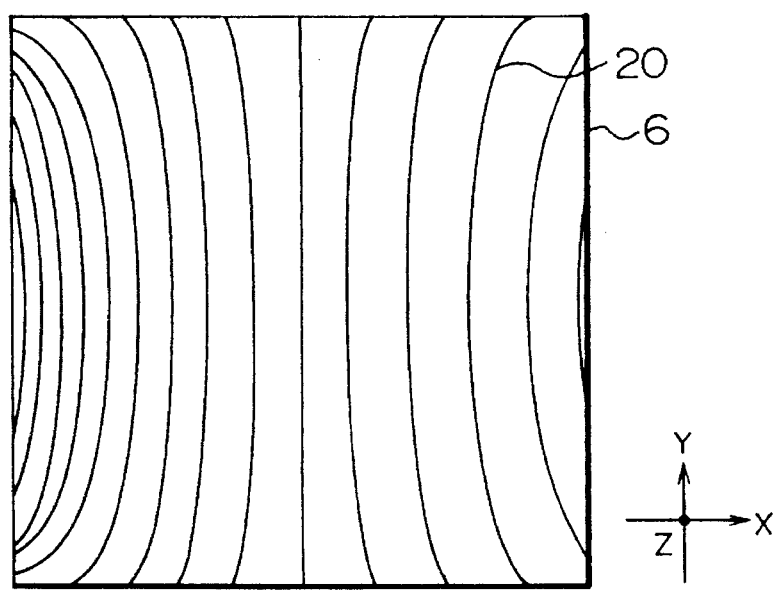
FIG. 2 is a plan view showing, by way of example only, traces of grooves or slits formed in a diffraction grating employed in the optical module according to the invention.

Now, the present invention will be described in detail in conjunction with the preferred or exemplary embodiments thereof by reference to the drawings.

FIG. 1 is a partially sectional view showing an optical module according to a first embodiment of the invention. In this figure, a reference numeral 1 denotes a light emitting device which may be constituted by, for example, a semiconductor laser device or the like. The light emitting device or the semiconductor laser device 1 is driven by a driving current which is modulated with an information signal to be transmitted and emits a light beam 100 having a predetermined wavelength. The light beam 100 emitted from the light emitting device 1 will reach a lens 3 via a cover glass 2. The light beam passed through the lens 3 and denoted by a reference numeral 104 is concentrated onto an end face 5 of an optical fiber 4 for transmission therethrough. (In the following, this light beam 104 will be referred to as the transmitted light beam only for convenience of description.)

On the other hand, a light beam 105 which originates in other optical module or and equivalent reaches the optical module now under consideration after transmission through the optical fiber 4 and emanated from the end face 5 thereof impinges on the cover glass 2 after passing through the lens 3 in following the optical path reversely to the transmitted light beam 104. (Hereinafter, the light beam 105 will be referred to as the received light beam.) Provided on the cover glass 2 at a top or bottom surface thereof is a diffraction grating 6 of the phase type diffraction grating. The diffraction grating 6 has grooves engraved in a predetermined grating pattern.

Figure 3:
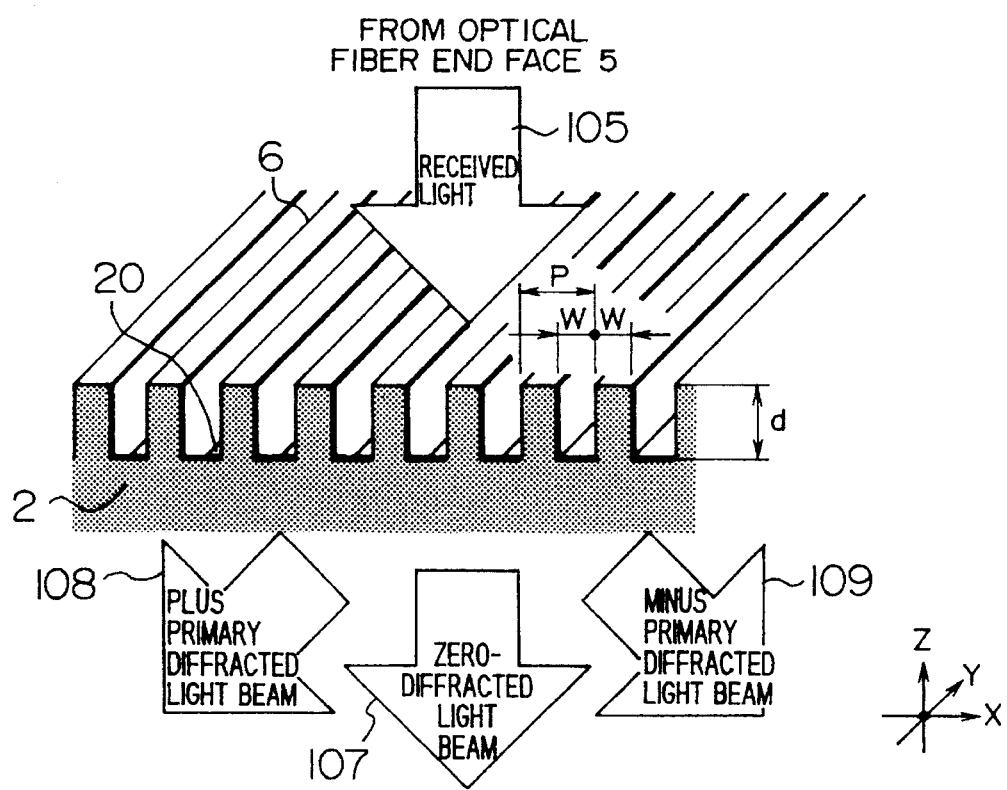
FIG. 3 is a fragmentary perspective view sowing in section a geometrical configuration and array of the grooves (slits)

FIG. 2 is a plan view showing, by way of example only, a pattern of the grooves 20 formed in the diffraction grating 6. In this figure, traces of the grooves 20 formed in the diffraction grating 6 in a center portion thereof are schematically illustrated by solid lines within a rectangular block with intermediate several grooves being omitted from illustration. On the other hand, FIG. 3 is a fragmentary perspective view for illustrating in cross section a geometrical configuration or shape of the grooves 20. The received light beam 105 transmitted through the lens 3 and incident on the diffraction grating 6 undergoes diffraction by the diffraction grating 6, as a result of which a plus-sign primary diffracted light beam 108 and a minus-sign primary diffracted light beam 109 of minus and plus signs are generated in addition to a non-diffracted light beam 107 which passed through the diffraction grating 6 intact as it is (i.e., without undergoing diffraction). At this juncture, the diffracted light beams 108 and 109 are primary ones of those resulting from diffraction of the received light beam 105 and diffracted at a same angle relative to non-diffracted or the zero-diffracted light beam 107 in opposite directions, respectively. These light beams 108 and 109 are referred to as the plus-sign primary diffracted light beam and the minus-sign primary diffracted light beam, respectively, only for the convenience of description. Of these diffracted light beams, the plus-sign primary diffracted light beam 108 impinges on a light receiving surface of a light receiving deice 7 such as a photodiode or the like which is disposed at a position close to the light emitting device 1. Thus, the light receiving device 7 outputs a detection signal in accordance with intensity of the incident light beam. The detection signal is then demodulated and processed as the received signal.

The diffraction grating 6 exhibiting the function mentioned above is known in general as the holographic diffraction grating, wherein the narrow grooves or slits are etched along with interference fringes which make appearance as a result of superposition of the light beam 100 emitted from the light emitting device 1 and the light beam 108 concentrated onto the light receiving device 7.

The light emitting device 1 and the light receiving diode 7 are fixedly secured to a sub-mount 11 of a column-like shape which in turn is secured to a base or stem 10, together with a monitor diode 8 employed for monitoring light output of the light emitting device 1. The light emitting device 1, the light receiving diode 7 and the sub-mount 11 as well as the monitor diode 8 mentioned above are sealed within a package 12 having an opening provided with the cover glass 2 mentioned previously. The lens 3 is fixedly mounted at the top of the package 12, while the optical fiber 4 is held unmovably by a fiber holder 14 which is mounted on the stem 10 in such a disposition as to cover the package 12 and is fixedly secured to the stem 10 by appropriate means such as welding.

With the structure of the optical module according to the first embodiment of the invention in which the diffraction grating is mounted internally of the optical module, as shown in FIG. 1, the received light beam as supplied through the optical fiber can impinge on the light receiving device 7 disposed in the close vicinity of the light emitting device 1. By virtue of this feature, the light emitting device 1 and the light receiving device 7 can be disposed extremely closely to each other when compared with the structure of the prior art optical module. Besides, the individual optical parts required fur implementing the optical module can be disposed therein in a linear array. Thus, the structure disclosed above can provide a great contribution to miniaturized and simplified implementation of the optical module.

Parenthetically, it goes without saying that the disposition and arrangements of the optical parts within the optical module are never restricted to that shown in FIG. 1, but many modifications or versions are conceivable without sacrificing any material benefits. By way of example, the fiber holder 14 may be stacked on the package 12 atop thereof. The lens 3 may alternatively be fixedly mounted on the fiber holder 14. Furthermore, the package 12 and the fiber holder 14 may be implemented in an integrated structure. Besides, although the optical module according to the instant embodiment is so arranged that the non-diffracted light of the light beam emitted from the light emitting device 1 and transmitted intact through the diffraction grating 6 is made use of as the transmitted light beam while the light beam emanated from the end face 5 of the optical fiber 4 and impinging on the diffraction grating 6 is diffracted by the same diffraction grating, wherein the plus-sign primary diffracted light beam resulting from the diffraction is used as the signal carrier light beam as received, the invention is never restricted to such structure. By way of example, by using the minus-sign primary diffracted light beam or the plus-sign primary diffracted light beam as the transmitted light beam, while the minus-sign primary diffracted light beam or one of the plus- and minus-sign diffracted light beam of the secondary or higher order may be utilized as the received light beam, substantially to the same effect as in the case of the optical module according to the instant embodiment of the invention.

Next, description will be made of an adjusting mechanism which can be employed in assembling the optical module according to the invention for practical application. By way of example, it will readily be understood that when the optical module of the structure according to the first embodiment shown in FIG. 1 is to be assembled in actuality, there arises a necessity for adjusting the diffracting direction in order that the plus-sign primary diffracted light beam 108 resulting from the diffraction of the light beam outputted or emanated from the end face 5 of the optical fiber 4 by the diffraction grating 6 can correctly be collected or concentrated onto the light receiving surface of the light receiving device or photodiode (photodetector in more general sense) 7. The adjustment to this end may be realized by adjusting rotatably the diffraction grating 6 relative to the optical axis of the incident light beam impinging on the diffraction grating or an axis extending in parallel to that optical axis.

Figure 4:
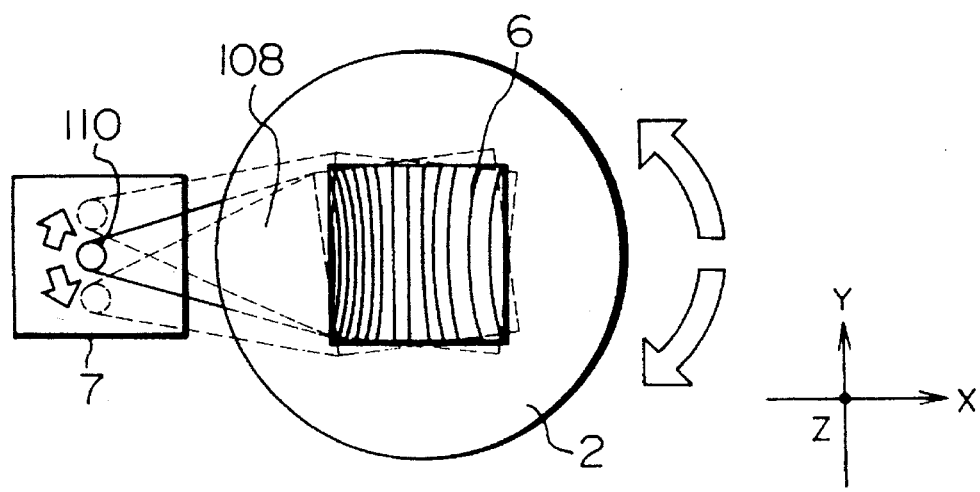
FIG. 4 is a plan view showing schematically an exemplary structure for positional adjustment of the light spot which can be adopted in the optical module according to the invention.

FIG. 4 is a plan view showing schematically an exemplary structure of the adjusting mechanism mentioned above. Parenthetically, it is to be noted that only the cover glass 2, the diffraction grating 6 provided at the top surface thereof and the light receiving diode 7 are extractively shown for simplification of illustration. Since the received light beam 105 (not shown in FIG. 4) impinges onto the diffraction grating 6 along the direction orthogonally to the plane of the drawing, the plus-sign primary diffracted light beam 108 travels in the direction substantially perpendicular to the grooves or slits of the diffraction grating 6, as viewed in the X-Y plane, to be thereby concentrated on the light receiving surface of the light receiving device or diode 7, whereby a light spot 110 is formed. Accordingly, when the cover glass 2 is rotated by a very small angle in the X-Y plane (i.e., around the optical axis of the received light beam 105 or an axis extending in parallel with that optical axis), the diffraction grating 6 secured to the cover glass 2 is also caused to rotate, which results in that the light spot 110 on the light receiving device 7 is displaced in a predetermined direction (i.e., in the direction coinciding at least approximately with the Y-direction, as viewed in FIG. 4). In this way, adjustment for compensating for the positional deviation of the light spot 110 relative to the light receiving surface of the photodetector 7 can be performed at an early stage of assembling the optical module. Incidentally, in the case of the structure of the optical module in which the cover glass 2 is fixedly secured to the package 12, the angular adjustment described above can be realized by adjusting angularly the package 12 relative to the stem 10, whereon the package 12 is bonded or welded to the stem 10.

Figure 5:
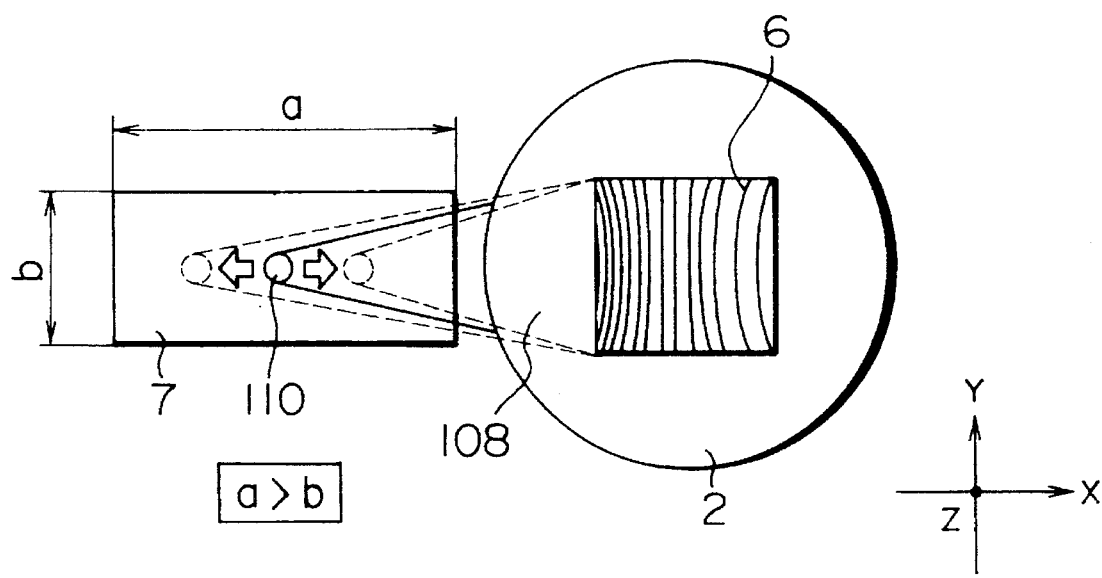
FIG. 5 is a plan view showing an exemplary structure of a light receiving device which can be employed in the optical module according to the invention.

At this juncture, it should be mentioned that the plus-sign primary diffracted light beam 108 resulting from the diffraction by the diffraction grating 6 and concentrated onto the light receiving diode 7 undergoes a change in respect to the angle of diffraction (i.e., angle formed between the optical axis of the non-diffracted light beam and the plus-sign primary diffracted light beam or minus-sign primary diffracted light beam) in dependence on the wavelength of the plus-sign primary diffracted light beam. For this reason, when the wavelength of the received light beam 105 incident on the diffraction grating 6 changes due to a factor such as temperature change, the light spot 110 on the light receiving diode 7 will be displaced in the direction interconnecting the diffraction grating 6 and the light receiving diode 7, as is illustrated in FIG. 5. Under the circumstances, in order to prevent the light spot 110 from being displaced away from the light receiving surface of the light receiving diode 7 nevertheless of change in the position of the light spot 110 due to variation in the wavelength, there should preferably be employed as the light receiving diode 7 such a light receiving device which has a light receiving surface or area extending over a sufficiently great length at least in the direction of displacement of the light spot 110, i.e., in the direction interconnecting the diffraction grating 6 and the light receiving diode 7. FIG. 5 is a plan view showing, by way of example, a structure of the optical module which is capable of coping with the problem mentioned just above. Parenthetically, in FIG. 5, there are shown only the cover glass 2, the diffraction grating 6 and the light receiving diode 7, similarly to FIG. 4. In the case illustrated in FIG. 5, it is assumed that the direction in which the light spot 110 is displaced due to change in the wavelength coincides with the X-axis. Thus, the light receiving diode 7 has a light receiving area having a side $a$ in the X-direction which is longer than a side $b$ in the Y-direction. In this conjunction, it should however be noted that the light receiving area or surface of the light receiving diode 7 is never restricted to an elongated rectangular shape but can be implemented in an elliptical or trapezoidal form.

Further, the position at which the light receiving diode 7 is mounted is not limited to those shown in FIGS. 4 and 5, but the light receiving diode 7 can be disposed at any given position so far as it can be accommodated within the package 12. In this conjunction, it is however noted that when the position of the light receiving diode 7 is changed, disposition or orientation of the diffraction grating 6 must naturally be so adjusted that the diffracted light beam as selected can be concentrated or focussed onto the light receiving diode 7. Besides, it will have to be mentioned that the number of the light receiving diode 7 is not limited to one but two or more light receiving devices may be provided. By way of example, a pair of light receiving devices may be disposed at symmetrical positions relative to the light emitting device in opposition to each other with the light emitting device being thus located at a middle position between the light receiving devices, so that both the plus-sign primary diffracted light beam and the minus-sign primary diffracted light beam can be received by the paired light receiving devices, respectively. With this arrangement, the light utilization efficiency or availability in the signal receiving operation can significantly be enhanced, to a great advantage.

In the case of the embodiments described above, it has been assumed that a single type of light signal is transmitted through the optical fiber. It should however be appreciated that the optical module according to the invention can equally find application to the system where two or more different types of light signals are to be handled. In that case, however, each of the light signals behaves as stray light to the other signal light, which increases the optical crosstalk. Accordingly, some measures must be taken for decreasing the optical cross-talk.

Figure 6:
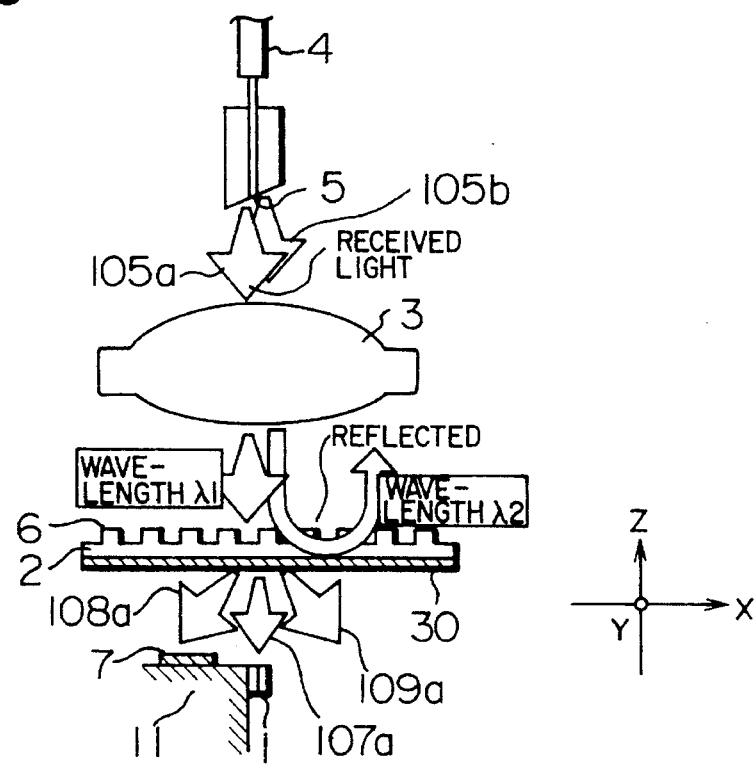
FIG. 6 is a partially sectional view showing schematically a structure of the optical module according to a second embodiment of the invention.

FIG. 6 is a partially sectional view for illustrating schematically a structure of the optical module according to a second embodiment of the present invention. In the optical module according to the instant embodiment, there is adopted the aforementioned measures for decreasing the optical crosstalk in the case where two or more different types or species of signal lights are to be handled. In FIG. 6, same or like parts as those shown in FIG. 1 are denoted by like reference symbols.

In the system to which the optical module shown in FIG. 6 is applied, it is assumed that two different types of signal lights having mutually different wave-lengths $\lambda_1$ and $\lambda_2$ are transmitted through the medium of the optical fiber 4. In the optical module, the diffraction grating 6 is provided on the top surface of the cover glass 2. On the other hand, provided on the lower surface of the cover glass 2 is a band pass optical filter (wavelength selective optical filter, to say in another way) 30 which is so designed as to allow the received light beam of the wavelength $\lambda_1$ (designated by 105a in FIG. 6) to pass therethrough while reflecting the received light beam of the wavelength $\lambda_2$ (designated by 105b in FIG. 6). At this juncture, it should however be mentioned that although the band pass optical filter 30 is disposed on the lower surface of the cover glass 2 in the case of the optical module shown in FIG. 6, disposition of the band pass optical filter 30 is never limited to that position. In other words, the band pass optical filter 30 may be disposed at any desired position so long as it lies on the optical path which extends from the end face 5 of the optical fiber 4 to the light receiving diode 7. By way of example, the band pass optical filter 30 may be disposed on the top or upper surface of the light receiving diode 7.

Further, although the signal light beams have respective wavelengths differing from each other for allowing the plural signal light beams transmitted through the single optical fiber to be selectively received in the case of the embodiment shown in FIG. 6, the invention is not restricted to such arrangement. Other method for selectively receiving the signal light beams may equally be adopted. By way of example, there can be conceived a method of selective signal reception which is based on difference in the direction of polarization between the signal light beams. In other words, an optical fiber capable of retraining the plane of polarization is used as the optical fiber 4, wherein a polarizing filter is employed in place of the above-mentioned band pass optical filter 30. In that case, a desired signal light beam can be received selectively from a plurality of signal light beams which have different directions of polarization, respectively.

Figure 7:
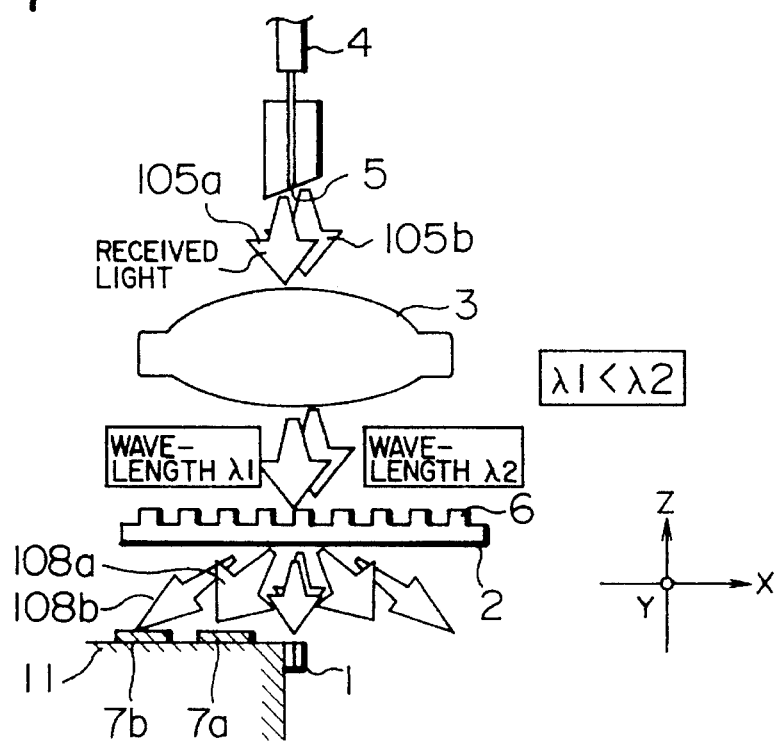
FIG. 7 is a partially sectional view showing schematically a main portion of the optical module according to a third embodiment of the invention.

Furthermore, when a plurality of signal light beams having mutually different wavelengths are transmitted through a single optical fiber, diffraction of these signal light beams by the diffraction grating brings about differences among them in respect to the angle of diffraction of the plus-sign primary diffracted light beam and the minus-sign primary diffracted light beam in dependence on the differences in the wavelength. By making use of this phenomenon, it is also possible to receive a plurality of signal light beams discretely and independently from one another. FIG. 7 is a partially sectional view showing schematically a major portion of the optical module according to the third embodiment of the invention which is so arranged as to be capable of receiving a plurality of signal light beams discretely and independently by making use of the difference in the angle of diffraction described above. In FIG. 7, like or same parts as those shown in FIGS. 1 and 6 are denoted by like reference symbols.

Referring to FIG. 7, in the optical module according to the instant embodiment, it is assumed that a received light beam 105a having a wavelength $\lambda_1$ and a received light beam 105b having a wavelength $\lambda_2$ which differs from the wavelength $\lambda_1$ (where it is assumed that $\lambda_1 > \lambda_2$) reach the diffraction grating 6 via the lens 3. As the result of diffraction by the diffraction grating 6, there make appearance plus-sign primary diffracted light beams 108a and 108b, respectively. However, in general, when light beams of different wavelengths are incident on the same diffraction grating, the light beam having the longer wavelength involves a greater angle of diffraction for both the plus-sign primary diffracted light beam and the minus-sign primary diffracted light beam as produced. As a consequence, in the optical module shown in FIG. 7, the plus-sign primary diffracted light beam 108b having a longer wavelength $\lambda_2$ is concentrated onto a position distanced more remotely from the light emitting device 1 than the plus-sign primary diffracted light beam 108a having the wavelength $\lambda_1$ which is shorter than the wavelength $\lambda_2$. Accordingly, a pair of discrete light receiving devices 7a and 7b are disposed at positions where the plus-sign primary diffracted light beams 108a and 108b can impinge on these light receiving devices separately from each other. Thus, the received light beams can be handled separately or independent of each other.

Now, turning to the optical module according to the second embodiment of the invention shown in FIG. 6, the band pass optical filter is employed for selectively receiving a plurality of signal lights having mutually different wavelengths. In this conjunction, it should be noted that the wavelength selecting function similar or equivalent to that of the band pass optical filter can be imparted to the diffraction grating itself by controlling or regulating the depth of the grooves (slits) of the diffraction grating. Next, an optical module according to a fourth embodiment of the invention in which the wavelength selecting function is imparted to the diffraction grating itself will be described by reference to FIG. 8.

Figure 8:
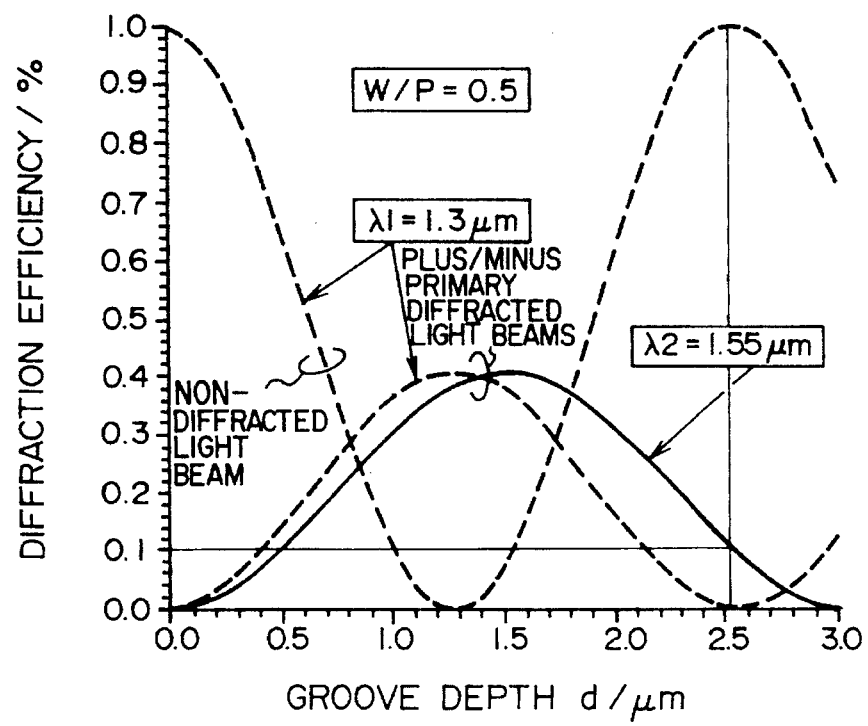
FIG. 8 is a view for graphically illustrating a relation between a groove depth and diffraction efficiency of a diffraction grating employed in the optical module according to a fourth embodiment of the invention.

FIG. 8 is a view for graphically illustrating a relation between a groove or slit depth $\underline{d}$ of the diffraction grating and diffraction efficiency thereof as determined by calculation for light beams having wave-length $\lambda_1$ of 1.3 μm and wavelength $\lambda_2$ of 1.55 μm, respectively, in the case of a diffraction grating formed in a substrate having a refractive index $\underline{n}$ of 1.51 and having grooves (or slits) each of a rectangular cross-section as shown in FIG. 3. As can be seen in FIG. 8, when the groove depth $\underline{d}$ of the diffraction grating lies within a range of 2.5 μm to 2.6 μm, there is scarcely produced either plus-sign primary diffracted light beam or the minus-sign primary diffracted light beam for the light beam having the wavelength $\lambda_1$ of 1.3 μm, and the light beam is transmitted intact through the diffraction grating with substantially 100% of the quantity of light. By contrast, for the light beam having the wavelength $\lambda_2$ of 1.55 μm, both the plus-sign primary diffracted light beam and the minus-sign primary diffracted light beam are produced with the diffraction efficiency of about 10%. The phenomenon in which the passage of the light beam through the diffraction grating is accompanied with neither the plus-sign primary diffracted light beam nor the minus-sign primary diffracted light beam can be explained as follows. Namely, when the groove depth $\underline{d}$ of the diffraction grating satisfies for a wavelength $\underline{\lambda}$ the condition given by $$(n_0 - n_1) \cdot d \approx m \cdot \lambda \qquad \ldots (3)$$

where $n_0$ represents the refractive index of the substrate material forming the diffraction grating, $n_1$ represents the refractive index of an ambient medium (e.g. air) of the diffraction grating, and $\underline{m}$ represents a given integer, the diffraction grating behaves for the light beam of the wavelength $\underline{\lambda}$ mentioned above as if it had no grooves at all. On the other hand, for the light beam having a wavelength differing from that wavelength $\underline{\lambda}$, the relation given by the expression (3) does not apply even for the same diffraction grating, whereby the plus-sign primary diffracted light beam as well as the minus-sign primary diffracted light beam is made available.

Such being the circumstances, assuming that a light emitting device designed for emitting a light beam having a wavelength $\underline{\lambda}$ of 1.3 μm is employed as the light emitting device 1 in the optical module according to the first embodiment shown in FIG. 1 and that the groove depth $\underline{d}$ of the diffraction grating 6 is in the range of 2.5 μm to 2.6 μm, the diffraction grating 6 can scarcely serve for the function as the diffraction grating for the light beam having the wavelength $\lambda_1$ of 1.3 μm used as the transmission light beam. Consequently, in the transmission mode, the light beam outputted from the light emitting device 1 is transmitted through the diffraction grating 6 intact with the quantity of light approximately of 100% to be focussed onto the end face 5 of the optical fiber 4 by the lens 3. This means that an extremely high light utilization efficiency can be assured for the signal transmitting or sending operation mode.

On the other hand, in the case of the optical module according to the second embodiment of the invention shown in FIG. 6 or the third embodiment shown in FIG. 7, even when both the light beam having the wavelength $\lambda_1$ of 1.3 μm and the light beam having the wavelength $\lambda_2$ of 1.55 μm are simultaneously emanated from the end face 5 of the optical fiber 4 and reach the diffraction grating 6 via the lens 3, only the light beam having the wavelength $\lambda_2$ undergoes diffraction by the diffraction grating 6, whereby the plus-sign primary diffracted light beam is concentrated or focussed onto the light receiving diode 7. By contrast, the light beam having the wavelength $\lambda_1$ is transmitted intact through the diffraction grating 6 and the cover glass 2. In this manner, the light receiving diode 7 can selectively receives only the light beam of the wavelength $\lambda_2$. Thus, the optical crosstalk can be decreased as in the case where the band pass optical filter is employed.

Next, referring to FIG. 9, description will be made of the optical module according to a fifth embodiment of the invention in which further improvement of the light utilization efficiency can be achieved in either of the transmitting mode or the receiving mode by designing optimally the diffraction grating 6. It should be recalled that the optical module according to the invention is so designed as to make use of a predetermined diffracted light beam produced by the diffraction grating 6 as the transmission light beam or the received light beam. Accordingly, it is possible to improve the light utilization efficiency in the receiving mode as well as in the transmitting or sending mode by enhancing the diffraction efficiency for the desired diffracted light beam, which can be realized by designing optimally the grooves 20 engraved in the diffraction grating 6.

Figure 9:
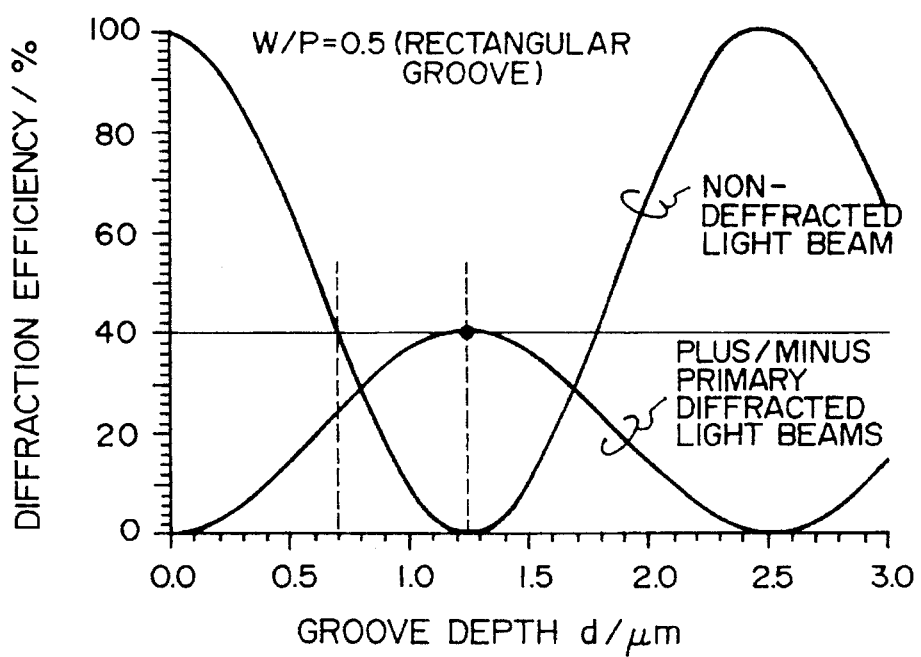
FIG. 9 is a view for graphically illustrating a relation between groove depth and diffraction efficiency of a diffraction grating employed in an optical module according to a fifth embodiment of the invention.

FIG. 9 is a view for graphically illustrating relations between the groove depth $\underline{d}$ and the diffraction efficiencies for the plus-sign primary diffracted light beam and the minus-sign primary diffracted light beam in an optical module incorporating the diffraction grating 6 having the grooves each of a rectangular cross-section such as shown in FIG. 3 on the assumption that the ratio between the pitch $\underline{P}$ and the width $\underline{W}$ of the grooves (i.e., the ratio W/P) is 0.5 (i.e., the width $\underline{W}$ of the grating groove is equal to a half of the inter-groove pitch $\underline{P}$), the wavelength of the light beam incident on the diffraction grating is 1.3 µm, the substrate material in which the grating grooves are engraved has a refractive index of 1.52 and that the ambient atmosphere is air (the refractive index of which is 1.0).

In the diffraction grating in which the groove width and the inter-groove width are equal to each other, the diffraction efficiencies of the diffracted light beams of even-number orders except for the zero-diffracted light beam (i.e., the light beam of zeroth order) can be made to be zero. For this reason, the plus-sign primary diffracted light beam as well as the minus-sign primary diffracted light beam can be made available with a high diffraction efficiency, as can be seen from FIG. 9. By way of example, when the groove depth $\underline{d}$ is designed to be about 0.7 µm, the diffraction efficiency of about 20% can be achieved for both the plus-sign primary diffracted light beam and the minus-sign primary diffracted light beam while ensuring the diffraction efficiency of about 40% for the zero-diffracted light beam. Thus, by incorporating the diffraction grating mentioned above as the diffraction grating 6 in the optical modules according to the preferred embodiments described hereinbefore, there can be achieved satisfactory light utilization efficiency not only in the receiving operation mode and but also in the transmitting or sending operation mode. Furthermore, it will be seen from FIG. 9 that the diffraction efficiency for the plus-sign primary diffracted light beam and the minus-sign primary diffracted light beam can be increased up to ca. 40%. In that case, however, the diffraction efficiency for the zero-diffracted light beam is 0 (zero)%. Accordingly, when the diffraction grating mentioned just above is to be employed in the optical module according to the present invention, there will be required such arrangement that the plus-sign primary diffracted light beam is used as the transmission light beam with the minus-sign primary diffracted light beam being used as the received light beam or vice versa.

Next, a sixth embodiment of the present invention will be described in which the grooves (slits) of the diffraction grating are formed each in a saw-tooth like shape in an attempt for enhancing the diffraction efficiency of the diffraction grating.

Figure 10:
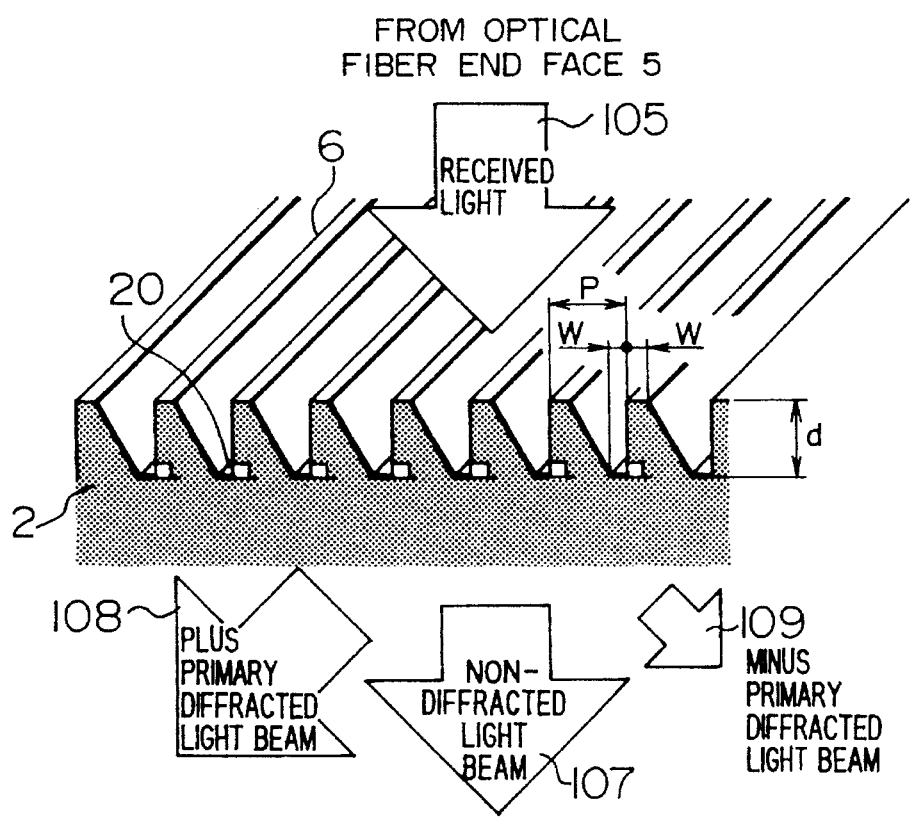
FIG. 10 is a fragmentary perspective view for illustrating a cross-sectional shape of grooves or slits of a diffraction grating employed in an optical module according to a sixth embodiment of the invention.

FIG. 10 is a fragmentary perspective view showing a major portion of the optical module in which a diffraction grating 6 having saw-tooth like grooves 20 formed therein is employed according to the sixth embodiment of the invention. With the saw-tooth like implementation of the grooves of the diffraction grating, it is contemplated to mean such implementation of the grooves 20 formed in the diffraction grating 6 in which each of the grooves has an asymmetrical shape in cross section such as trapezoidal or triangular form (i.e., the ratio between the groove width $\underline{W}$ and the pitch $\underline{P}$ thereof does not exceed 0.5) so that the diffraction grating presents a cross section like a saw-tooth array. With the arrangement of the diffraction grating grooves in this manner, the diffraction effectuated by the grating cooperates with the light beam refracting effect of the slanted walls of the grooves, eventually giving rise to unbalance between the plus-sign primary diffracted light beam and the minus-sign primary diffracted light beam. To say in another way, the diffraction efficiency for the plus-sign primary diffracted light beam can be increased while that for the minus-sign primary diffracted light beam being lowered, when compared with the diffraction efficiency of the diffraction grating having the grooves of rectangular shape in cross section.

Figure 11:
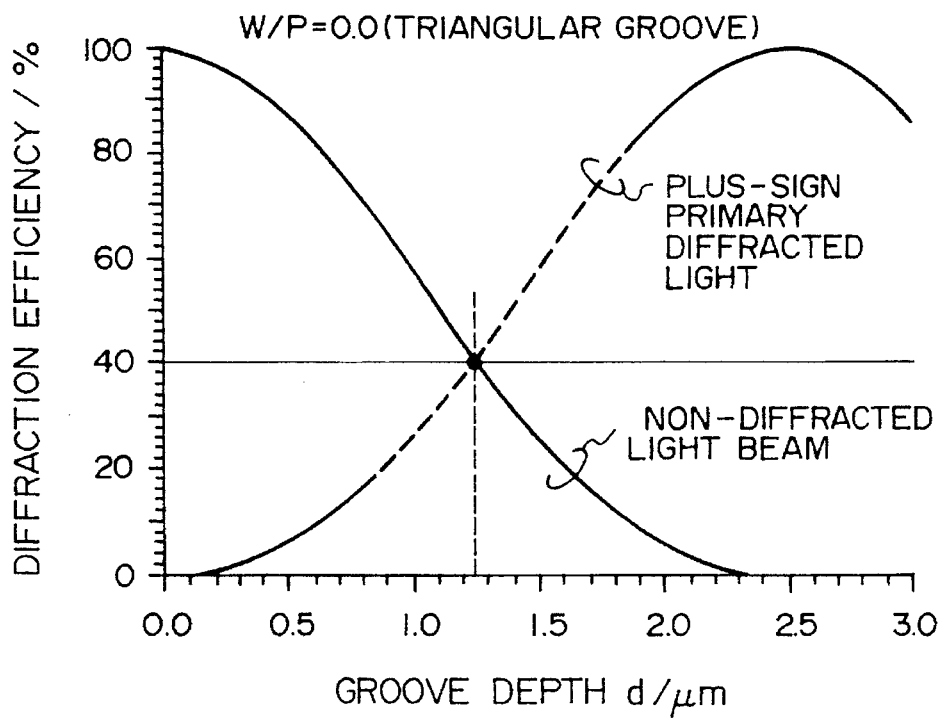
FIG. 11 is a view for graphically illustrating a relation between to groove depth and the diffraction efficiency of a diffraction grating employed in an optical module according to a seventh embodiment of the invention.

FIG. 11 is a view for graphically illustrating a relation between the groove depth $\underline{d}$ and the diffraction efficiency of the plus-sign primary diffracted light beam in the optical module incorporating a diffraction grating having grooves each of a triangular cross section where the ratio W/P is equal to zero according to a seventh embodiment of the invention. Parenthetically, the wavelength, the refractive index of the substrate and other factors are assumed to be same as those in the case of the design described hereinbefore by reference to FIG. 9. As can be seen in FIG. 11, the diffraction efficiency of about 40% can be obtained for the zero-diffracted light beam and the plus-sign primary diffracted light beam in the case where the groove depth $\underline{d}$ is about 1.25 µm. Besides, comparative examination of the light utilization efficiency in the optical module according to the invention with that of the conventional optical module shows that when the diffraction grating having the grooves formed in the saw-tooth like array mentioned previously is employed in the optical module according to the invention, the diffraction efficiency sufficient for practical applications can be achieved by setting at least the groove depth $\underline{d}$ such that relation given by the following expression (4) can be satisfied.

$$d \geq 0.31\lambda/(n_0 - n_1) \qquad \ldots (4)$$

where $\underline{\lambda}$ represents the wavelength of diffracted light beam, $n_0$ represents a refractive index of a substrate material forming the diffraction grating, and $n_1$ represents a refractive index of an ambient medium in contact with the diffraction grating (such as that of ambient air).

As will now be appreciated from the above, by incorporating in the optical module according to the invention the diffraction grating 6 engraved with the grooves 20 in a saw-tooth like array, the diffraction efficiency of the plus-sign primary diffracted light beam used as the received light beam can significantly be enhanced without lowering the diffraction efficiency of the zero-diffracted light beam used as the carrier for transmitting or sending data or information signal. Besides, the saw-tooth like implementation of the grooves of the diffraction grating is effective for reducing the quantity of light of the minus-sign primary diffracted light beam which will otherwise become stray light without being used as the transmission light beam or received light beam. Thus, there can eventually be obtained an advantage that degradation of the optical crosstalk due to the stray light can be prevented or suppressed to a minimum.

Next, description will be made of the optical module according to an eighth embodiment of the invention which is directed to prevention of deterioration of the optical crosstalk possibly brought about by the stray light.

Figure 12:
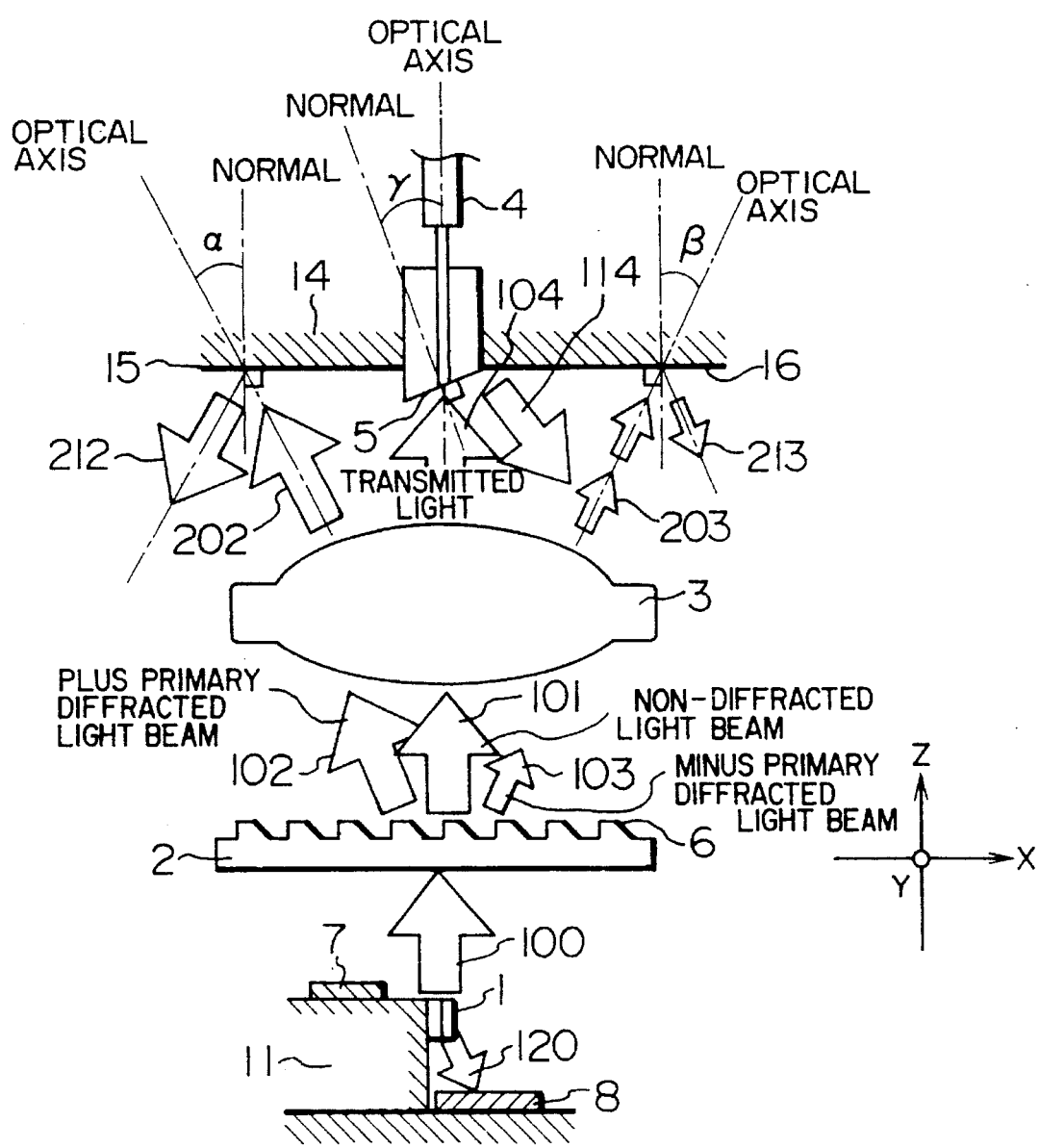
FIG. 12 is a fragmentary sectional view showing schematically a major portion of an optical module according to an eighth embodiment of the invention.

FIG. 12 is a partially sectional view showing schematically a major portion of the optical module according to the eighth embodiment of the invention which is so implemented as to mitigate or suppress deterioration of the optical crosstalk due to the stray light. In FIG. 12, like or same parts as those shown in FIGS. 6 and 7 are denoted by using like reference symbols.

In the optical module according to the invention, a transmission light beam 100 emitted by the light emitting device 1 is separated into a zero-diffraction light beam 101, a plus-sign primary diffracted light beam 102 and a minus-sign primary diffracted light beam 103, as is illustrated in FIG. 12. Of these diffracted light beams, the plus-sign primary diffracted light beam 102 and the minus-sign primary diffracted light beam 103 are precluded from transmission through the optical fiber 4 but reflected at inner walls 15 and 16 of the fiber holder 14 of the optical module as indicated at 212 and 213 after transmission through the lens 3 and behave as the stray light. Under the circumstances, when such arrangement is adopted that the signal transmission or sending and the signal reception are performed by a single optical module, incidence or impingement of the stray light mentioned above will degrade the optical crosstalk characteristics between the transmission light beam and the received light beam, which in turn will deteriorate the reception performance of the optical module.

With the structure of the optical module according to the eighth embodiment of the invention shown in FIG. 12, it is contemplated to prevent or suppress degradation in the optical crosstalk due to the stray light. To this end, the optimal geometrical configuration of the fiber holder 14 is realized such that the normals to the inner wall surfaces 15 and 16 of the fiber holder 14 are not in parallel with the optical axes of the light beams 202 and 203 incident on these wall surfaces. (In the case of the embodiment illustrated in FIG. 2, the light beams 202 and 203 are inclined by predetermined angles $\alpha$ and $\beta$, respectively, relative to the normal.) By virtue of such arrangement, the light beams 212 and 213 reflected at the inner wall surfaces of the fiber holder 14 will travel in the directions which differ from those of the incident light beams 202 and 203, respectively. For this reason, even when the stray light should impinge on the diffraction grating 6 via the lens 3, the resulting diffracted light beam will travel in a direction which is not oriented toward the light receiving diode 7. Similarly, by adopting such arrangement that the normal to the plane of the end face 5 of the optical fiber 4 is not in parallel with the optical axis of the transmission light beam 104 incident on the end face 5 (but slanted with a predetermined angle $\gamma$), a part of the transmission light beam 104 which is reflected at the end face 5 without being injected into the optical fiber 4 and becomes stray light will travel in the direction which does not lead to the light receiving diode 7. In particular, when the end face 5 of the optical fiber 4 is so slanted that the reflected light beam 114 ravels in the direction opposite to that leading to the light receiving diode 7, as illustrated in FIG. 12, adverse influence of the stray light can more effectively be suppressed, whereby the optical crosstalk can further be reduced.

In this conjunction, it must also be pointed out that by reducing the reflectivities of the inner wall surface of the fiber holder and the end face of the optical fiber, it is possible to decrease the intensity of the stray light and hence protect the optical crosstalk against deterioration in addition to or in place of the stray light reducing measures described above. As a typical method for reducing the reflectivity of the inner wall surface of the fiber holder and the end surface of the optical fiber, there may be mentioned a method of applying an oxide film having a low reflectivity for the wavelength of the light beam of concern, which method per se is known in the art.

Figure 13:
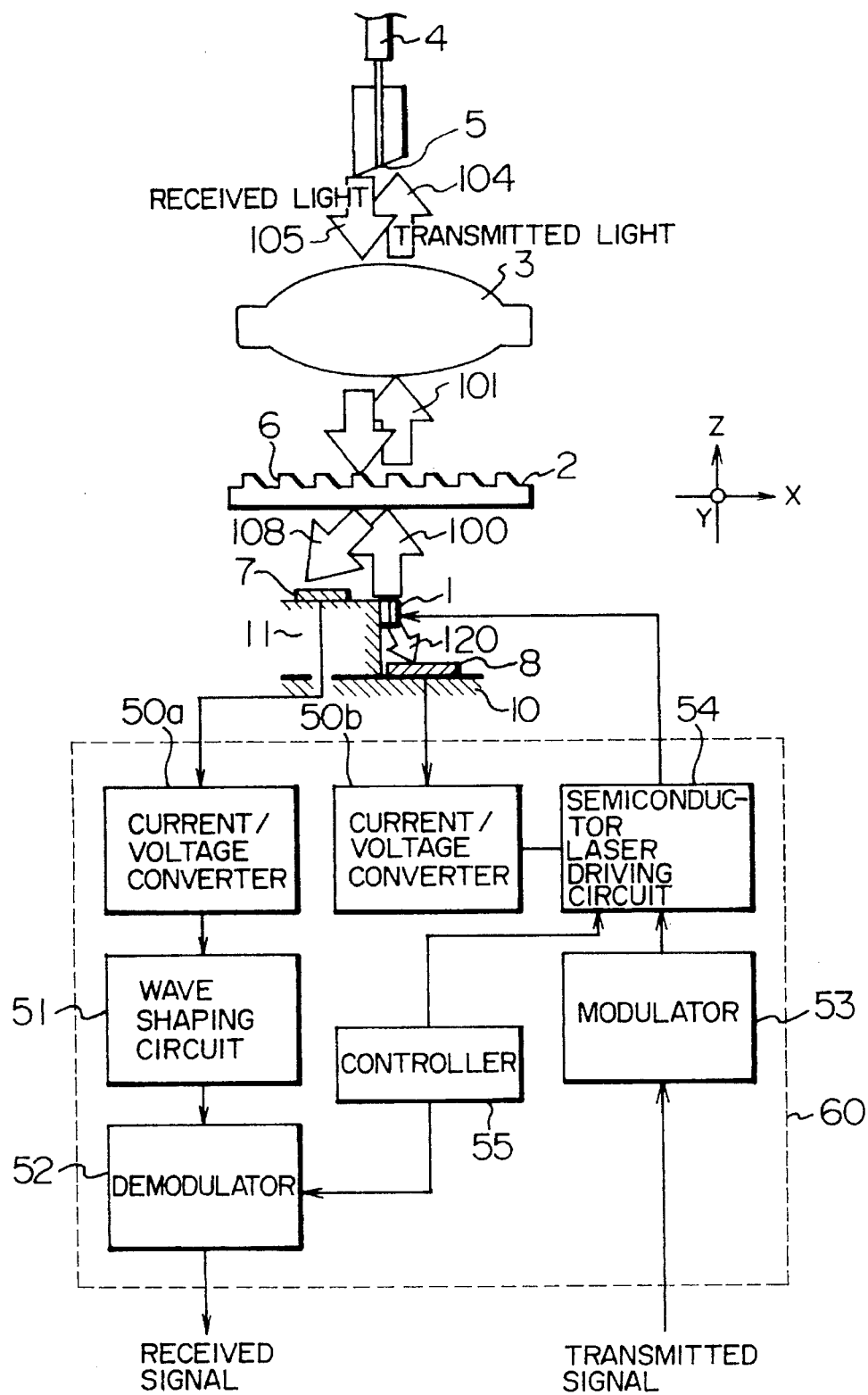
FIG. 13 is a block diagram showing schematically and generally a mayor portion of an optical transmission system according to an embodiment of the invention.

FIG. 13 is a block diagram showing schematically and generally a structure to which the optical module according to the first embodiment of the invention is applied. It goes however without saying that the various embodiments of the optical module described hereinbefore can equally be employed. Thus, in FIG. 13, same or like parts as those mentioned hereinbefore are denoted by like reference symbols and repeated description thereof is omitted.

In the signal reception mode, the light beam 108 impinging on the detection area of the light receiving diode 7 undergoes a photoelectric conversion, whereon the signal current resulting therefrom is restored to an information or data signal via operations of a current-to-voltage converter 50a, a wave shaping device 51 and a demodulator 52.

On the other hand, in the signal transmitting or sending operation, a carrier current is supplied to a modulator 53 to be modulated with data or information signal to be transmitted, as a result of which a semi-conductor laser driving signal is outputted from the modulator 53. The semiconductor laser driving signal is sent to a semiconductor laser driving device 54 which in turn supplies to the light emitting semiconductor device 1 a semiconductor laser driving current corresponding to the aforementioned driving signal. Thus, the light emitting device 1 emits a light beam of power modulated with the signal to be transmitted.

Parenthetically, it should be mentioned that the semiconductor laser driving device 54 is supplied with the output signal from the monitor diode 8 via a current-to-voltage converter 50b, whereby the light emission power of the light emitting device 1 is controlled through a feedback loop.

Further, a control unit 55 is connected to the demodulator 52 and the semiconductor laser driving device 54 for controlling the timing for transmitting/receiving operations.

Combination of the optical module and the transmitting/receiving units in the manner described above and illustrated in FIG. 13 makes it possible to realize an optical signal transmission system such as an optical signal communication system for practical purposes.

Figure 14:
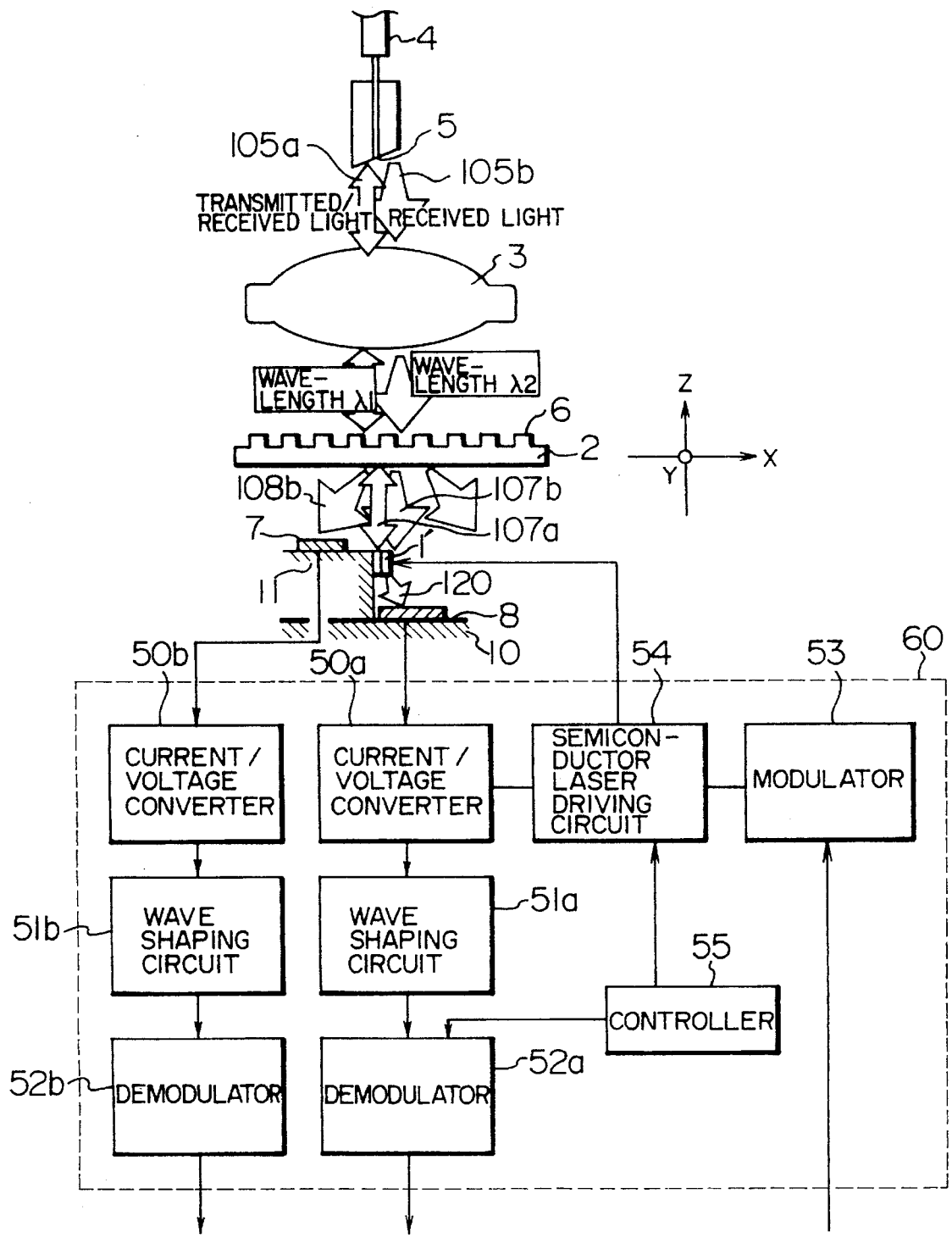
FIG. 14 is a block diagram showing schematically a major portion of an optical information transmission system according to another embodiment of the invention.

FIG. 14 is a block diagram showing schematically a major portion of another optical communication system in which the optical modules according to the invention are employed. The optical elements and the electric/electronic parts employed in the system shown in FIG. 14 are essentially same as those shown in FIG. 13 and denoted by like reference symbols. In the case of the system now under consideration, it is assumed that two discrete signal light beams having wavelengths $\lambda_1$ and $\lambda_2$ differing each other are to be transmitted through the optical fiber 4, wherein the received light beam 105a of wavelength $\lambda_1$ and the received light beam 105b of the wavelength $\lambda_2$ are simultaneously outputted from the end face 5 of the optical fiber 4 in each of the optical modules. Of these received light beams, the received light beam 105b having the wavelength $\lambda_2$ gives rise to the plus-sign primary diffracted light beam 108b via the lens 3 and the diffraction grating 6, wherein the plus-sign primary diffracted light beam 108b is concentrated onto the light receiving area of the light receiving diode 7. A signal current resulting from the photoelectric conversion is supplied to the current-to-voltage converter 50b incorporated in the transmitter/receiver unit 60, and a received signal (2) can be derived via the wave shaping circuit 51, the demodulator 52b and others. On the other hand, the received light beam 105a having the wavelength $\lambda_1$ is transmitted through the diffraction grating 6 and the cover glass 2 and impinges on the light emitting device 1' as a light beam 107a. Incidentally, in the optical communication system and the optical transmission system which the invention concerns, a so-called "time compression multiplexing" scheme according to which transmission and reception of signal are alternatively repeated without incurring overlap therebetween is adopted in general. Accordingly, assuming that the invention is applied to the time compression multiplexing system, the light emitting device 1' is turned off or inactive during a period in which the light beam 107a is incident on the light emitting device 1. Thus, the light emitting device 1' in the system according to the instant embodiment of the invention is imparted with such function that it emits the light beam having the wavelength $\lambda_1$ of e.g. 1.3 μm in the transmission mode while detecting (or guiding) the light beam incident on the light emitting device 1' in the deenergized or inactive state in the reception mode. As the light emitting device having the light detecting function in this manner, there may be mentioned a semiconductor laser device which operates as an optical waveguide in the deenergized or inactive state to thereby introduce a part of light beam incident on a front end face to a rear end face to thereby illuminate the monitor diode 8 downstream of the end surface.

Let's consider that the semiconductor laser device of the type mentioned above is used as the light emitting device 1'. In that case, in the transmission or sending operation, a light beam is emitted from the front end face with a predetermined quantity of light while the monitor diode 8 is illuminated by a light beam emitted from the rear end face with a predetermined quantity of light which is in proportion to the above-mentioned quantity of light emitted from the front end face. The output of the monitor diode 8 is fed back to a semiconductor laser driving circuit 54 as a light emission power control signal for the semiconductor laser device 1' via a current-to-voltage converter 50a incorporated in the transmitter/receiver unit 60. Parenthetically, inputted to the semiconductor laser driving circuit 54 is a signal to be transmitted which results from the modulation by the modulator 53, whereby a semiconductor laser driving current conforming to the above-mentioned signal is supplied to the semiconductor laser device 1' from the semiconductor laser driving circuit 54. As a result of this, the semiconductor laser device 1' emits a correspondingly modulated light beam for transmission.

On the other hand, in the receiving operation, a part of the light beam 107a incident on the end face of the semiconductor laser device 1', as described herein-before, is guided interiorly through the semiconductor laser device 1' to be emitted from the rear end face for illuminating the monitor diode 8. A received signal current corresponding to the quantity of light with which the monitor diode 8 is illuminated is delivered from the monitor diode 8, whereby a first receiving signal (1) is obtained via the current-to-voltage converter 50a, a wave shaping circuit 51a and the demodulator 52a. The semiconductor laser driving circuit 54 and the demodulator 52a are controlled by the control unit 55 which can change over the transmitting mode and the receiving mode to each other in an automatical manner.

At this juncture, it will be noted that the zero-diffracted light beam 107b of the wavelength $\lambda_2$ also impinges onto the front end face of the semiconductor laser device 1' in addition to the light beam 107a, which may incur degradation in the optical crosstalk between the received signals (1) and (2), giving rise to possibility of the reception performance for the received signal (1) being impaired. To cope with this problem, a band pass optical filter designed to be transmissive for the light beam having the wavelength $\lambda_1$ while reflecting the light beam of wavelength $\lambda_2$ should preferably be disposed on the front end face of the semiconductor laser device 1'. Owing to this arrangement, there can be realized the sufficiently reduced optical crosstalk.

It should be added that the light emitting device which can be employed in the optical module according to the instant embodiment is never restricted to the semiconductor laser device mentioned above, but any device capable of exhibiting the light emission function and the photodetector function described hereinbefore can be employed. Besides, when a device which can simultaneously serve for both the light emitting function and the photodetector function is used, the transmission/reception scheme is not limited to the time compression multiplexing system, but any desired transmission system can rather arbitrarily be adopted.

In the foregoing description of the various embodiments of the invention, it has been assumed that the optical module includes a single light emitting device, wherein a light beam emitted therefrom is transmitted via a single optical fiber. It should however be appreciated that the invention is never restricted to such arrangement. In other words, a plurality of light emitting devices may be incorporated in a single optical module with a plurality of optical fibers being used for interconnecting the optical modules without departing from the spirit and scope of the present invention. To this end, a semiconductor laser array may be employed as the light emitting device, wherein a plurality of optical fibers may separately be coupled to the individual semi-conductor laser elements in the array. Besides, plus-sign and minus-sign primary diffracted light beams and the zero-diffracted light beam generated from a single laser beam by the diffraction grating may optically be coupled to separate optical fibers, respectively.

Furthermore, it goes without saying that the optical modules (bidirectional optical transmission and receiving modules) according to the various embodiments of the invention described so far can be employed in a variety of optical communication systems.

What is claimed is:

1. An optical transmission and receiving module, comprising:

a light emitting device;

a photodetector;

an optical element for introducing a light beam emitted from said light emitting device to a predetermined optical transmission path;

a housing for accommodating at least said light emitting device and said photodetector;

a window formed in said housing and provided with a transparent member for passing light therethrough in opposite directions, said light emitting device and said photodetector being provided on the same side with respect to said transparent member; and a diffraction grating having grooves of rectilinear or curvilinear traces and provided on either an upper surface or alternatively a lower surface of said transparent member.

2. An optical transmission and receiving module according to claim 1, wherein at least said diffraction grating and said transparent member are mounted for rotation around a predetermined axis which extends substantially in parallel with an optical axis of the light beam passing through said transparent member.

3. An optical transmission and receiving module according to claim 1, wherein said photodetector has a light receiving surface of either a rectangular form or a trapezoidal form or an elliptic form having a longitudinal axis extending in a direction which is substantially in parallel with a straight line interconnecting said photodetector and said light receiving device.

4. An optical transmission and receiving module according to claim 1, further comprising:

a band pass optical filter disposed on an optical path extending from said optical transmission path to said photodetector for allowing a light beam of a predetermined wavelength to pass therethrough selectively.

5. An optical transmission and receiving module according to claim 1, wherein a diffraction efficiency of said diffraction grating for a first light beam emanated from said optical transmission path, undergone diffraction of said diffraction grating and reaching said light receiving device is same or higher than a diffraction efficiency of said diffraction grating for a second light beam emitted from said light emitting device and incident on said optical transmission path via said diffraction grating.

6. An optical transmission and receiving module according to claim 5, wherein said diffraction grating has a groove depth which satisfies relation given by $$d \approx m \cdot \lambda_2/(n_0-n_1)$$

where $\underline{d}$ represents said groove depth, $n_0$ represents a refractive index of a substrate material constituting said diffraction grating, $n_1$ represents a refractive index of an ambient medium contacting said diffraction grating, $\lambda_2$ represents wavelength of said second light beam, and $\underline{m}$ represents an integer.

7. An optical transmission and receiving module according to claim 5, wherein the diffraction efficiency of said diffraction grating for said first light beam is greater than 40%.

8. An optical transmission and receiving module according to claim 7, wherein grooves of said diffraction grating are each formed in a saw-tooth like shape in cross section.

9. An optical transmission and receiving module according to claim 7, wherein grooves of said diffraction grating are each formed in a saw-tooth like shape in cross section.

10. An optical transmission and receiving module according to claim 8, wherein said diffraction grating has a groove depth (d) which satisfies relation given by $$d \geq 0.3\lambda_1/(n_0-n_1)$$

where $\underline{d}$ represents said groove depth, $n_0$ represents a refractive index of a substrate material constituting said diffraction grating, $n_1$ represents a refractive index of an ambient medium contacting said diffraction grating, and $\lambda_1$ represents wavelength of said first light beam.

11. An optical transmission and receiving module according to claim 9, wherein said diffraction grating has a groove depth (d) which satisfies relation given by $$d \geq 0.3\lambda_1/(n_0-n_1)$$

where $\underline{d}$ represents said groove depth, $n_0$ represents a refractive index of a member constituting said diffraction grating, $n_1$ represents a refractive index of an ambient medium contacting said diffraction grating, and $\lambda_1$ represents wavelength of said first light beam.

12. An optical transmission and receiving module according to claim 1, wherein a normal to the plane of said end face of said optical transmission path or normals to the planes of inner surface portions of said housing to which diffracted light beams generated by said diffraction grating do not extend in parallel with the optical axes of said diffracted light beams.

13. An optical transmission and receiving module according to claim 1, wherein said light emitting device has a function for emitting a light beam in accordance with a predetermined electric signal, and a photodetection function for outputting a predetermined electric signal in accordance with a quantity of light of a light beam incident on said light emitting device.

14. An optical transmission and receiving module according to claim 1, wherein said housing is a sealed housing for sealing at least said light emitting device and said photodetector therein.

15. An optical transmission and receiving module according to claim 1, wherein said transparent member of said window formed in said housing enables sealing of the housing for sealing said light emitting device and said photodetector in said housing.

16. An optical transmission and receiving module according to claim 1, wherein said window is provided in a surface of said housing delimiting an aperture in said housing and said transparent member of said window covers said aperture.

17. An optical transmission and receiving module according to claim 5, wherein at least one of a direction of polarization and a wavelength of said first light beam is different from at least one of a direction of polarization and wavelength of said second light beam, and said diffraction efficiency of said diffraction grating for said first light beam is higher than said diffraction efficiency of said diffraction grating for said second light beam.

18. An optical communication system including an optical transmission and receiving module which comprises a light emitting device, a photodetector, an optical element for introducing a light beam emitted from said light emitting device to a predetermined optical transmission path, a housing for accommodating at least said light emitting device and said photodetector, a window formed in said housing and provided with a transparent member for passing light therethrough in opposite directions, and a diffraction grating having grooves of rectilinear or curvilinear traces and provided on an upper surface or a lower surface of said transparent member, said light emitting device and said photodetector being provided on the same side with respect to said transparent member.

19. An optical transmission and receiving module according to claim 18, wherein said housing is a sealed housing for sealing at least said light emitting device and said photodetector therein.

20. An optical transmission and receiving module according to claim 18, wherein said transparent member of said window formed in said housing enables sealing of the housing for sealing said light emitting device and said photodetector in said housing.

21. An optical transmission and receiving module according to claim 18, wherein said window is provided in a surface of said housing delimiting an aperture in said housing and said transparent member of said window covers said aperture.

22. An optical transmission and receiving module according to claim 1, wherein said diffraction grating have respective traces of said rectilinear or curvilinear traces with curvature centers in different positions.

* * * * *